United States Patent
Marmonier

(10) Patent No.: US 6,367,308 B1
(45) Date of Patent: Apr. 9, 2002

(54) METHOD OF MEASURING THE DENSITY OF A DIELECTRIC GAS IN A BURIED METAL-CLAD LINE

(75) Inventor: Jean Marmonier, Aix-les-Bains (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/466,071

(22) Filed: Dec. 17, 1999

(30) Foreign Application Priority Data

Dec. 18, 1998 (FR) .............................. 98 15981

(51) Int. Cl.⁷ ................................. G01N 7/00
(52) U.S. Cl. ..................... 73/23.29; 73/30.02
(58) Field of Search ............ 73/30.02, 30.01, 73/40.5 R, 23.28, 23.29

(56) References Cited

U.S. PATENT DOCUMENTS 5,693,873 A * 12/1997 Thuries et al. ............. 73/30.01
5,889,467 A * 3/1999 Marmonier et al. ..... 73/40.5 R

FOREIGN PATENT DOCUMENTS

| DE | 34 28 322 A11 | 2/1986 |
| DE | 38 28 015 A1 | 3/1990 |
| DE | 39 10 696 A1 | 10/1990 |
| EP | 0 875 973 A1 | 11/1998 |
| FR | 2 730 308 A1 | 8/1996 |
| FR | 2 734 362 A1 | 11/1996 |

* cited by examiner

Primary Examiner—John E. Chapman
(74) Attorney, Agent, or Firm—Sughrue Mion, PLLC

(57) ABSTRACT

A method of measuring the density of a dielectric gas under pressure in a buried metal-clad electricity line consists in measuring the pressure and the temperature of the dielectric gas by means of a sensor mounted on the case of the line, and in compensating the pressure measurement as a function of the temperature measurement using constant density curves that have been corrected on the basis of a curve representing the difference between the temperature at the surface of the case of the line and the mean temperature of the gas inside the line for increasing amounts of current carried by the line conductor.

2 Claims, 2 Drawing Sheets

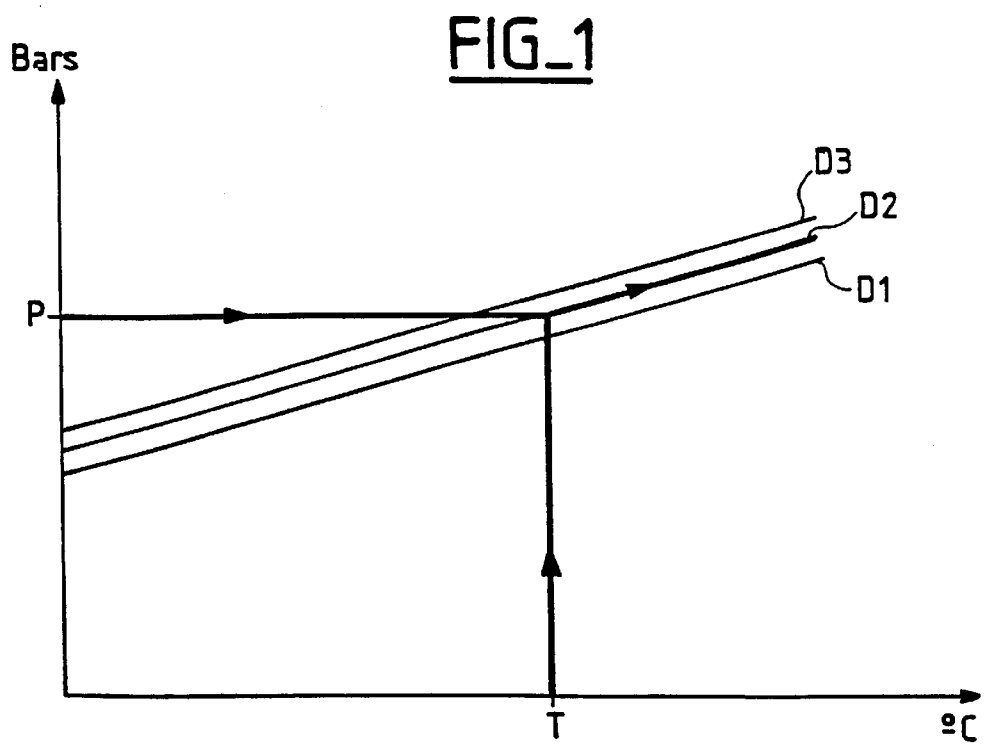
FIG_1
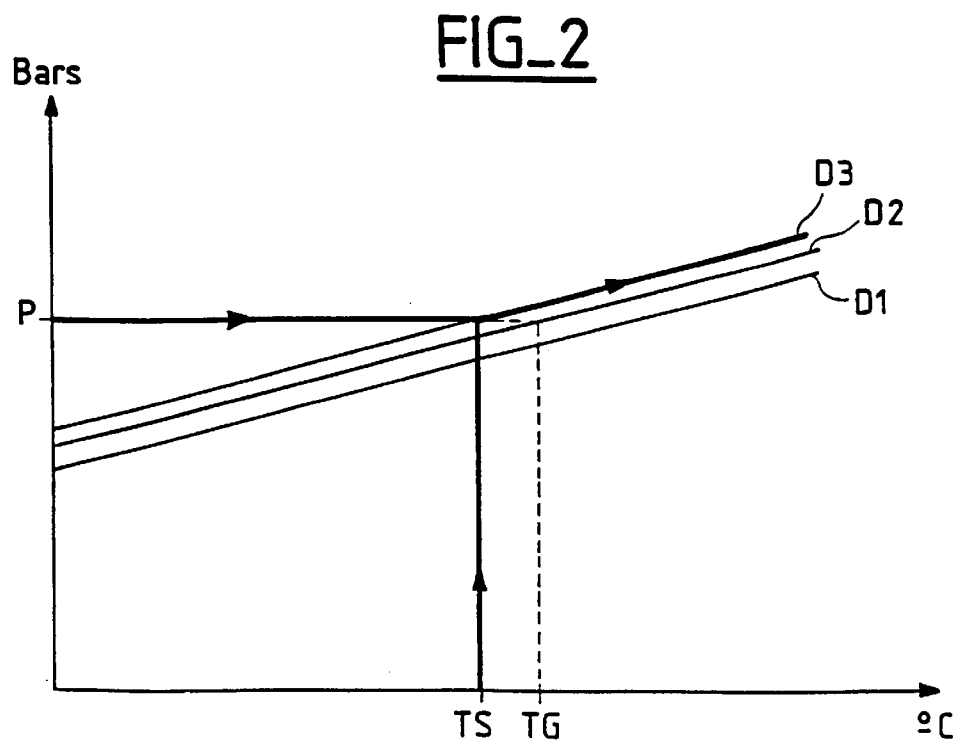
FIG_2

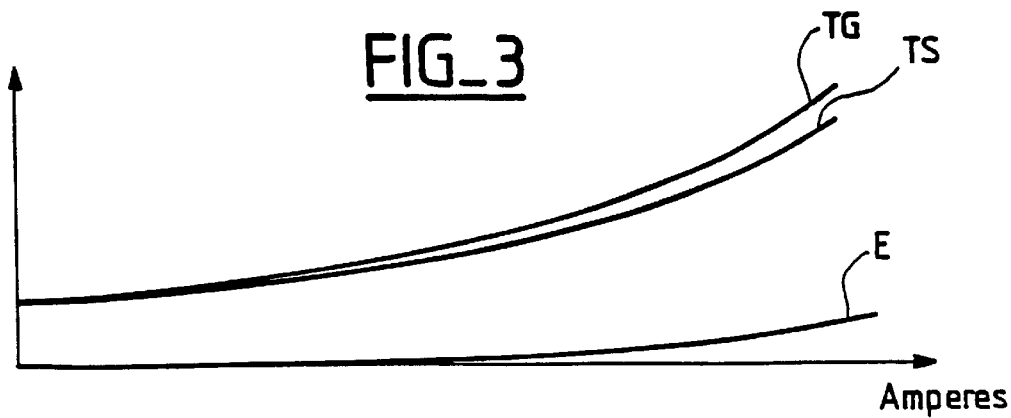
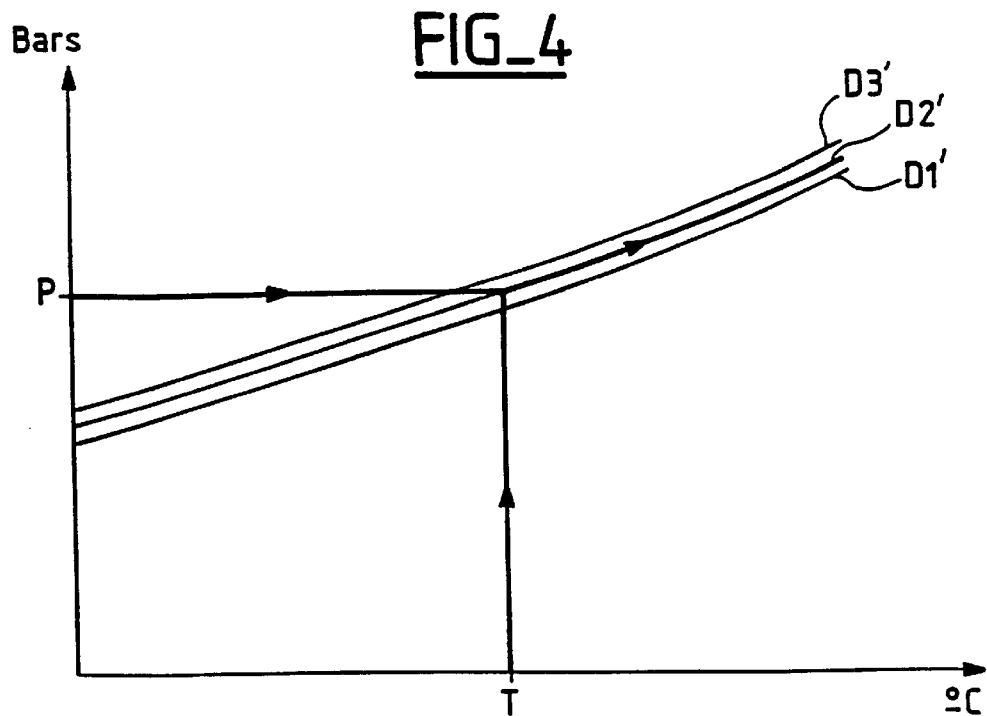
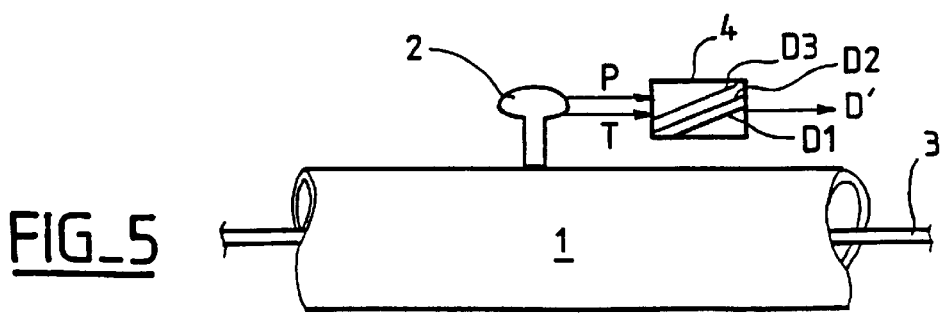

METHOD OF MEASURING THE DENSITY OF A DIELECTRIC GAS IN A BURIED METAL-CLAD LINE

The invention relates to gas-insulated buried metal-clad electricity lines. Such a line comprises a cylindrical metal case filled with a dielectric gas under pressure, generally sulfur hexafluoride ($SF_6$) or a mixture of sulfur hexafluoride and nitrogen, and an electrical conductor is disposed therein. In use, the case of the line is buried in the ground at a depth of two or more meters.

The invention relates more particularly to a method of measuring the density of the dielectric gas under pressure inside the case of a buried metal-clad line.

BACKGROUND OF THE INVENTION

In general, measuring the density of the gas contained inside the case of a buried metal-clad line consists in measuring the pressure P and the temperature T of the gas and in compensating the pressure measurement as a function of the temperature measurement using constant density curves D1, D2, and D3 for the gas, as shown in FIG. 1. That compensation can be performed either in a data acquisition module receiving the pressure and temperature values from two distinct sensors, or else directly in the housing of the pressure sensor which then becomes a density sensor. In the latter case, temperature is measured by the sensor and the output signal from the sensor (e.g. a signal at the industrial 4 mA–20 mA standard) is representative of the measured density.

A large error in determining the density of the gas is due to the fact that the temperature sensor, regardless of whether or not it is integrated in the pressure sensor, is mounted on the outside surface of the case of the line such that the sensor measures the temperature of the gas only in a zone close to the surface of the case. Unfortunately, this temperature measurement is generally not equal to the mean temperature of the gas inside the case, so it follows that the density as measured suffers from an error of the order of several percent. By way of example, as shown in FIG. 2, the temperature TS of the case can be several degrees Celsius (typically 5° C.) lower than the mean temperature of the gas TG inside the case because a nominal current is being carried by the conductor of the line. As a result, the density D3 as determined from the measured pressure P and the measured temperature TS can be greater than the real density D2 of the gas. This error penalizes protection of the metal-clad line.

To mitigate that drawback, it is known to compensate the measured density as a function of the current carried by the line conductor on the assumption that the greater the current carried by the line conductor, the greater the error in the measured density of the insulating gas. Nevertheless, that solution is expensive to implement since it requires an additional physical magnitude to be measured, namely the current. Unfortunately, the current carried by the metal-clad line can be measured only at an inlet stage, so it is necessary to disseminate this measured information over all of the density sensors mounted along the metal-clad line, and in practice that is complex and expensive.

OBJECT AND SUMMARY OF THE INVENTION

The object of the invention is thus to propose a method of measuring the density of a dielectric gas under pressure in a buried metal-clad electricity line that does not present the above drawback.

The Applicant has observed that with buried metal-clad lines, there is a direct link between the current carried by the line conductor and the temperature difference between the surface of the case of the line and the gas inside said case due to the fact that the ambient temperature around the case varies little and, in particular, that for a metal-clad line that is buried the envelope is not subject to the effects of solar radiation.

More particularly, the invention provides a method of measuring the density of a dielectric gas under pressure in a buried metal-clad electricity line, the method consisting in measuring the pressure and the temperature of the dielectric gas by means of a sensor mounted on the case of the line, and in compensating the pressure measurement as a function of the temperature measurement using constant density curves for the dielectric gas, wherein the constant density curves are corrected on the basis of a curve representative of the difference between the temperature at the surface of the case of the line and the mean temperature of the gas inside the line for increasing amounts of current carried by the line conductor.

The invention also provides a sensor for implementing the method of the invention.

BRIEF DESCRIPTION OF THE DRAWINGS

The method of the invention will be better understood on reading the following description given with reference to the drawings.

FIG. 1 is a graph of pressure measured in bars against temperature measured in degrees Celsius, illustrating the method of measuring the density of the dielectric gas in a buried metal-clad line using constant density curves.

FIG. 2 is a graph analogous to that of FIG. 1, showing the measured density of the gas when no account is taken of the fact that the temperature measured by the sensor mounted on the case of the line is different from the mean temperature of the gas inside the case.

FIG. 3 shows the difference that exists between the temperature at the surface of the case of the buried metal-clad line and the mean temperature of the gas inside the case for increasing amounts of current being conveyed by the line conductor.

FIG. 4 is a graph analogous to that of FIG. 1 showing the method of the invention for measuring the density of the dielectric gas in a buried metal-clad line by using constant density curves that have been corrected on the basis of a curve representative of the difference between the temperature at the surface of the case of the line and the mean temperature of the gas inside the line for increasing amounts of current being conveyed by the line conductor.

FIG. 5 is highly diagrammatic and shows a buried metal-clad line with a density sensor for implementing the method of the invention.

MORE DETAILED DESCRIPTION

FIGS. 1 and 2 are described above.

In FIG. 3, the curve TG shows how the mean temperature of the gas inside the case of a buried metal-clad line varies as a function of increasing current carried by the conductor of the metal-clad line. The curve TS shows how the surface temperature of the case of the buried metal-clad line varies as a function of increasing current being carried by the conductor of the metal-clad line. The curves TS and TG are obtained by experimental measurements. The curve E represents the difference between the curves TG and TS. For each temperature value measured by a temperature sensor mounted on the outside surface of the case of the buried metal-clad line, there therefore corresponds a difference between the temperature as measured by the sensor and the mean temperature of the gas inside the case of the metal-clad line. And each difference between the temperature measured by the temperature sensor and the mean temperature of the gas inside the case of the metal-clad line corresponds to an error in calculating the density of the case if the constant density curves shown in FIGS. 1 and 2 are used.

In FIG. 4, this error is incorporated in corrected constant density curves D1', D2', and D3'. These corrected constant density curves correspond to the constant density curves D1, D2, and D3 each having the curve E added thereto in the ordinate direction.

Consequently, with the method of the invention, the measured density of the dielectric gas under pressure inside the case 1 (FIG. 1) of a buried metal-clad line is calculated solely on the basis of a pressure measurement P and a temperature measurement T performed on the gas by means of a sensor 2 mounted on the outside surface of the case and in communication with the inside volume of the case. There is no need to measure the current carried by the conductor 3 of the metal-clad line. The correct constant density curves D1', D2', D3' can be programmed in the computation circuits of the sensor 2 if it constitutes a density sensor, or in an acquisition unit 4 if two separate sensors are, in fact, used to measure pressure and temperature, thereby making it possible to obtain a density value D' for the dielectric gas that presents improved accuracy.

What is claimed is:

1. A method of measuring the density of a dielectric gas under pressure in a buried metal-clad electricity line, the method comprising:

measuring a pressure and a temperature of the dielectric gas at a surface of a case of the line; and determining the density of the dielectric gas based on the pressure measurement and the temperature measurement using constant density curves for the dielectric gas, wherein the constant density curves are corrected based on a curve representative of a difference between the temperature at the surface of the case of the line and a mean temperature of the dielectric gas inside the line, said difference being a function of increasing amounts of current carried by a line conductor.

2. A sensor for measuring the density of a dielectric gas under pressure in a buried metal-clad electricity line comprising:

means mounted on a case of the line for measuring pressure of the dielectric gas;

means mounted on a case of the line for measuring temperature of the dielectric gas; and means for determining the density of the dielectric gas based on the pressure measurement and the temperature measurement using constant density curves for the dielectric gas, wherein the constant density curves are corrected based on a curve representative of a difference between the temperature at the surface of the case of the line and a mean temperature of the dielectric gas inside the line, said difference being a function of increasing amounts of current carried by a line conductor.

* * * * *